United States Patent [19]

Tsai

[11] 4,415,469

[45] Nov. 15, 1983

[54] PHASE STABLE COMPOSITIONS CONTAINING A PARAFFINIC POLYOL AND AN ISOCYANATE REACTIVE PREPOLYMER

[75] Inventor: Chung-Chieh Tsai, South Salem, N.Y.

[73] Assignee: Stauffer Chemical Company, Westport, Conn.

[21] Appl. No.: 317,102

[22] Filed: Nov. 2, 1981

[51] Int. Cl.$^3$ .................... C08G 63/42; C08G 59/40; C08F 233/00; C08K 3/00
[52] U.S. Cl. .................... 252/182; 428/425.6; 525/528; 525/533; 525/507; 528/73; 528/110; 528/297
[58] Field of Search .................. 252/182; 528/73, 110, 528/297; 525/528, 507, 533

[56] References Cited

U.S. PATENT DOCUMENTS

| | | | |
|---|---|---|---|
| 2,928,810 | 3/1960 | Belanger | 528/110 |
| 2,947,717 | 8/1960 | Belanger et al. | 528/110 |
| 2,951,778 | 9/1960 | Haberlin | 528/110 |
| 3,142,657 | 7/1964 | Fisch | 528/110 |
| 3,431,237 | 3/1969 | Harry | 528/110 |
| 3,433,771 | 3/1969 | Vasta | 528/73 |
| 3,576,903 | 4/1971 | Groff | 525/423 |
| 3,723,568 | 3/1973 | Hoeschele | 525/438 |
| 3,847,874 | 11/1974 | Murakami et al. | 528/73 |
| 3,929,730 | 12/1975 | Graefe et al. | 521/159 |
| 3,993,576 | 11/1976 | Barron | 528/76 |
| 4,066,628 | 1/1978 | Ashida et al. | 528/73 |
| 4,165,247 | 8/1979 | Brew et al. | 528/73 |
| 4,220,732 | 9/1980 | McBayer | 521/167 |
| 4,321,351 | 3/1982 | Zappinger et al. | 528/110 |

FOREIGN PATENT DOCUMENTS 890745   3/1962   United Kingdom .

*Primary Examiner*—H. S. Cockeram
*Attorney, Agent, or Firm*—Richard P. Fennelly

[57] ABSTRACT

Phase stable compositions containing a paraffinic polyol chain extender, e.g., 1,4-butanediol, and an isocyanate-reactive prepolymer containing hydroxy and epoxy groups are formed by heating the polyol and prepolymer in the presence of one another to yield the phase stable composition. The composition, when reacted with a polyisocyanate, yields poly(oxazolidone/urethane) thermoset compositions.

19 Claims, No Drawings

PHASE STABLE COMPOSITIONS CONTAINING A PARAFFINIC POLYOL AND AN ISOCYANATE REACTIVE PREPOLYMER

BACKGROUND OF THE INVENTION

1. Field of the Invention

The present invention relates to a composition, which is resistant to phase separation, comprising a paraffinic polyol chain extender and an isocyanate-reactive prepolymer.

2. Description of the Prior Art

Paraffinic polyols, e.g., the butanediols, have been used as chain extenders in the synthesis of polyurethane compositions. However, it is recognized that such chain extenders, when added to isocyanate-reactive polyols, can produce a composition which is prone to phase separation thereby necessitating a thorough mixing of the polyol/chain extender composition prior to use. This problem of chain extender separation has been solved in certain ways by recent investigators. For example, in U.S. Pat. No. 3,929,730 to P. U. Graefe it is proposed that a butanediol chain extender be combined with at least one other difunctional chain extender which is soluble in the polyol. B. G. Barron in U.S. Pat. No. 3,993,576 teaches use of an effective quantity of a derivative of butylene glycol or propylene glycol as a ccompatibilizing agent. In U.S. Pat. No. 4,220,732 to R. L. McBrayer it is proposed that phenyldiethanolamine be combined with a butanediol chain extender prior to its addition to the polyol.

When a paraffinic polyol chain extender, e.g., a butanediol, is combined with an isocyanate-reactive prepolymer containing hydroxy and epoxy moieties, a similar problem of phase separation has occurred.

SUMMARY OF THE PRESENT INVENTION

The present invention relates to phase stable compositions comprising a paraffinic polyol chain extender and an isocyanate-reactive prepolymer containing hydroxy and epoxy groups and to the process for obtaining them. The term "phase stable" is intended to encompass single phase compositions that are resistant to phase separation when stored. The composition containing the paraffinic polyol and prepolymer needs only to be heated for an effective amount of time to render the resulting composition phase stable. The present compositions do not need a compatibilizing agent for the polyol chain extender and prepolymer. Such compositions, when reacted with polyisocyanates yield poly(oxazolidone/urethane) thermoset compositions.

DETAILED DESCRIPTION OF THE INVENTION

The phase stable compositions of the present invention, when reacted with a polyisocyanate, will yield poly(oxazolidone/urethane) thermoset compositions. These stable compositions comprise an isocyanate-reactive prepolymer containing hydroxy and epoxy groups, and a paraffinic polyol chain extender, but do not contain a compatibilizing agent for the polyol and prepolymer as required by certain prior art compositions.

The isocyanate reactive prepolymer containing hydroxy and epoxy groups is present in major amount in the compositions of the present invention. Typically, it will be present at from about 60% to about 95%, by weight of the composition. Such prepolymers can be formed in various ways.

For example, the prepolymers can be formed by reacting a diepoxide with either a monocarboxylic acid or, preferably, a dicarboxylic acid, under conditions such that the prepolymer contains equal molar amounts of reactable epoxy groups and reactable secondary non-terminal hydroxy groups. The prepolymer resulting from this reaction has the formula

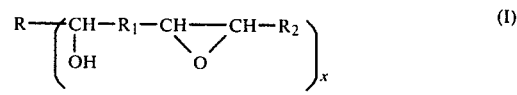

where R, $R_1$ and $R_2$ are independently any grouping of atoms to which a carbon atom can be covalently linked, including substituted or unsubstituted alkylene, arylene, alkylene-arylene and (for R and $R_2$) hydrogen and x is a positive integer of either 1 or 2.

When monocarboxylic acids are used to form the prepolymer of formula (I), it is preferred to add the acid to a slight excess of the diepoxide so as to favor the reaction in which one side of the diepoxide reacts thereby generating a secondary non-terminal -OH group at the end while leaving the terminal epoxide group at the other end unreacted:

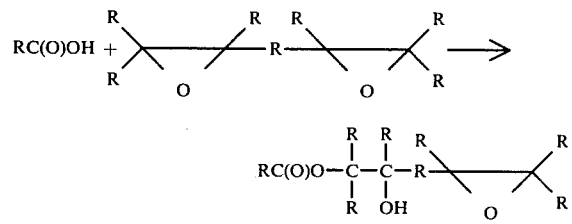

In the above formula R can be any of the groups described above for R, $R_1$ or $R_2$.

Reaction of monocarboxylic acids will generally result in a statistical mixture of desired prepolymer, fully reacted epoxide reagent containing no terminal epoxy groups, and unreacted diepoxide. It should be appreciated that the prepolymer resulting from the reaction of a monoacid and the diepoxide has one terminal epoxy group and one secondary hydroxy group. The end of the prepolymer remote from the terminal epoxy group is capped with an ester linkage. Reaction of a diisocyanate, for example, with such a prepolymer produces oxazolidone and urethane linkages in the same chain of the recurring unit, i.e., the polymer backbone, with the ester groups being in pendant side chains.

Reaction of diacids with the diepoxides is favored and is preferably carried out using slightly more than two moles of diepoxide to diacid. In this manner all the acid is reacted and a prepolymer is formed by reacting the terminal epoxy group of one epoxide reactant with one end of the diacid and the terminal epoxy group of another epoxide reactant with one end of the diacid and the terminal epoxy group of another epoxide reactant with the other end of the diacid:

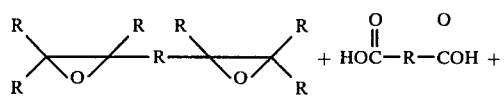

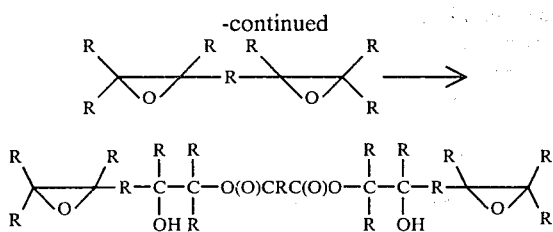

When a diisocyanate, for example, is reacted with the prepolymer from a diacid and diepoxide, the fact that the prepolymer is capped at both ends by epoxy groups forces formation of oxazolidone linkages in the polymer backbone of the recurring unit only. The presence of the non-terminal, secondary hydroxy groups, forces urethane formation in pendant side chains of the recurring unit.

In both of the cases given above, the prepolymer that results, is preferably, substantially acid free and has one or two terminal epoxy groups, each with an associated, non-terminal secondary hydroxy group.

The diepoxide and acid reactants that can be used to form the prepolymers described above can be selected from a wide variety of compounds as long as the above type of reaction occurs.

The type of diepoxides shown in U.S. Pat. No. 4,066,628 to K. Ashida et al., which is incorporated herein by reference, can be employed for use in connection with the present invention. Such diepoxides include the diglycidyl ethers of dihydric mononuclear and fused ring phenols, the diglycidyl ethers of nonfused polynuclear phenols having an alkylene, sulfone, carboxy, oxygen or sulfur bridging group between the phenol rings, the diglycidyl ethers of novolac resins, dicyclopentadiene dioxide, vinyl cyclohexane dioxide, the dicyclohexyl oxide carboxylates, and the diglycidyl derivatives of aromatic primary amines. Some representative diepoxides include the diglycidyl ethers of bisphenol A, hydroquinone, resorcinol, catechol, methylhydroquinone, 1,6-hexanediol, and 1,12-dodecanediol, alicyclic diepoxides, such as vinylcyclohexene dioxide, and dicyclopentadiene dioxide.

The acids that can be used include the saturated and unsaturated mono- and dicarboxylic acids. Representative acids include: acetic acid, benzoic acid, phthalic acid, isophthalic acid, terephthalic acid, adipic acid, oxalic acid, succinic acid, acrylic acid, methacrylic acid, $\alpha$-phenylacrylic acid, $\alpha$-chloroacrylic acid, $\alpha$-chloroacetic acid, etc.

Preferred prepolymers for use in the present compositions, however, have terminal epoxy groups and non-terminal, secondary hydroxy groups and are formed by reaction of polyol, acid anhydride, the diepoxide in either a sequential reaction in which the polyol and acid anhydride are reacted to form an acid terminated adduct which is then reacted with diepoxide. Preferably, however, polyol, acid anhydride and diepoxide are reacted in a one-step procedure to yield the substantially acid free prepolymer which can then be reacted with polyisosyanate.

If the above-mentioned two step procedure for forming the prepolymer from polyol, acid anhydride and diepoxide is chosen, the same general process described in U.S. Pat. No. 3,576,903 to G. L. Groff can be employed. The disclosure of that patent is incorporated herein by reference in regard to formation of the epoxy terminated polymers described therein.

In the preferred one step process, the polyol, acid anhydride and diepoxide are all reacted together so as to produce the preferred prepolymer composition containing a prepolymer containing terminal epoxy groups and non-terminal, secondary hydroxy groups. This prepolymer composition should be essentially free of acid groups and should be curable to the desired poly(oxazolidone/urethane) thermoset when combined with polyisocyanate. If one expresses the molar amounts of material needed to give that result one arrives at reaction of 2 moles of hydroxy as polyol with 2 moles or less of anhydride and 2 moles or more of diepoxide. Use of such amounts of the various reagents will produce the following prepolymer as the major prepolymer component in the composition, with $R_1-R_5$ independently being any group to which carbon atoms can be covalently bound (alkylene, arylene, alkylene/arylene, etc.) and R being the same as well as hydrogen:

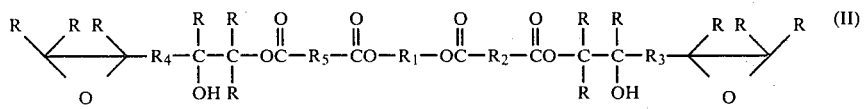

Formation of this prepolymer is favored when the molar amount of anhydride is no more than 2 and the amount of diepoxide is not less than that of acid anhydride, based upon a molar amount of hydroxy groups in the polyol set at 2.

Depending upon the precise amounts of reactants employed, however, it is also possible to yield a prepolymer in which one end contains a terminal epoxy group with associated non-terminal, hydroxy group, and the other end terminates in a hydroxy group. This prepolymer has the formula given below with R-R$_3$ having the same meaning as $R_1$14 $R_5$, above:

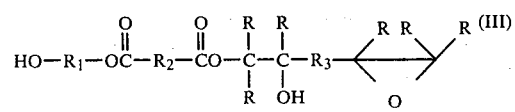

This type of prepolymer is produced in the process shown in U.S. Pat. No. 3,847,874 to Y. Murakami and is favored in the reaction when the molar amount of acid anhydride is present in amounts which approximate one half the molar amount of the hydroxy groups in the polyol that is present.

The compositions of the present invention can include prepolymer compositions which contain mixtures of both of the aforesaid prepolymers (II) and (III).

A wide variety of diepoxides, acid anhydrides and polyols can be selected for use in making preferred prepolymers (II) and (III).

Representative acid anhydrides which can be chosen encompass both the aromatic and aliphatic anhydrides including: succinic, adipic, maleic, glutaric, sebacic, phthalic, tetrachlorophthalic, and tetrabromophthalic.

Representative polyols include: polyethylene glycol, polypropylene glycol, 1,4-butanediol, pentaerythritol, 2,3-butanediol, ethylene glycol, propylene glycol, trimethylene glycol, 1,4-dihydroxy-2-butene, 1,12-dihydroxyoctadecane, 1,4-dihydroxycyclohexane, 2,2-dimethyl-1,3-propanediol, 2-ethyl-2-butylpropanediol, glycerol, erythritol, sorbitol, mannitol, inositol, trimethylol propane, dipentaerythritol, polybutadiene diol, polytetramethylene diol, polycaprolactone diol, and phosphorus containing diols and polyols.

The type of diepoxides shown in U.S. Pat. No. 4,066,628 to K. Ashida et al., which is incorporated herein by reference, can be employed for use in connection with the present invention. Such diepoxides include the diglycidyl ethers of dihydric mononuclear and fused ring phenols, the diglycidyl ethers of nonfused polynuclear phenols having an alkylene, sulfone, carboxy, oxygen or sulfur bridging group between the phenol rings, the diglycidyl ethers of novolac resins, dicyclopentadiene dioxide, vinyl cyclohexane dioxide, the dicyclohexyl oxide carboxylates, and the diglycidyl derivatives of aromatic primary amines. Some representative diepoxides include the diglycidyl ethers of bisphenol A, hydroquinone, resorcinol, catechol, methylhydroquinone, 1,6-hexanediol, and 1,12-dodecanediol, alicyclic, diepoxides, such as vinylcyclohexene dioxide, and dicyclopentadiene dioxide.

The preferred prepolymer composition(s) can be formed in the single step process by mixing the polyol, anhydride and diepoxide, preferably in the presence of an effective amount (0.02 to 2%, by weight of all the reaction ingredients) of a catalyst designed to promote the reaction. Representative catalysts tending to promote the formation of the prepolymer and favor oxazolidone formation include the quaternary ammonium salts (e.g., tetramethyl ammonium chloride); the metal alkoxides (e.g., lithium n-butoxide); the metal halides and their complexes (e.g., lithium chloride/hexamethylphosphoramide complex); and the organometallic compounds (e.g., trialkyl aluminum). Catalysts which favor urethane formation include the organic tin compounds, diamines, and polyamines.

The paraffinic polyol chain extender is present in a minor amount in the compositions of the present invention. Typically, such a component will be present at from about 5% to about 40%, by weight of the composition. Representative examples of paraffinic polyol chain extenders include the butanediols, e.g., 1,4-butanediol, the hexanediols, octanediols, and ethylene glycol.

The phase-stable compositions of the present invention rely upon heating the prepolymer and polyol chain extender in the presence of each other for a length of time and for a temperature sufficient to improve the compatibility of these two types of material and to result in the phase-stable compositions. The temperature of this heating step can range from about 50° C. to about 160° C., preferably 90° C.—130° C., and the heating time from 10 to 0.5 hours, preferably 1-3 hours. Lower heating temperatures will require longer heating times, and vice-versa. The compositions of the present invention are substantially free of compatibilizing agents for the polyol chain extender and prepolymer which would be added to render the resulting composition containing them phase-stable.

The compositions of the present invention can also contain optional ingredients which do not adversely affect the characteristics of the compositions. For example, residual catalyst added either during the prepolymer formation process or catalyst added after that formation step to promote the latter poly(oxazolidone/urethane) formation step can be present. In addition one or more of the following types of ingredients, which will not interfere with the latter formation of the thermoset poly(oxazolidone/urethane) compositions, can be present: blowing agents, mold releasing agents, pigments, and reinforcing agents.

The following Examples illustrate certain preferred embodiments of the present invention.

EXAMPLE 1

A prepolymer containing hydroxy and epoxy group substitution was first formed by the following procedure. A mixture of 7.79 kg. (52.6 equivalent weights) of phthalic anhydride, 15.92 kg. (53.1 hydroxy equivalent weights) of polyethylene glycol (ave. mol. wt.: 600), 20.34 kg. (53.3 epoxy equivalent weights) of the diglycidyl ether of bisphenol A (EPON 828 diepoxide), and 132.5 gm. of methyltrialkyl ($C_8$–$C_{10}$) ammonium chloride catalyst (ADOGEN 464 brand) was heated at 120°–151° C. for 35 minutes in a 56.8 liter stainless steel reactor. The resulting prepolymer was found to be free of acidic material, had an epoxide equivalent of 865 and a Brookfield viscosity at 70° C. of 140 poise (LVT Model, No. 4 spindle, 30 rpm).

A mixture of 494 gm. (0.571 epoxy equivalent weights) of the prepolymer prepared above and 212 gm. (4.71 hydroxy equivalent weights) of 1,4-butanediol chain extender yielded a cloudy dispersion having a viscosity of 205 poise at room temperature. This dispersion was heated at 110°–120° C. for about two hours. The resulting solution, after cooling down to room temperature, was a stable, clear solution and had 0.472 equivalent weights of epoxy functionality. The viscosity of this product was 39 poise at room temperature.

A mixture of 119 gm. (0.080 epoxy equivalent weights) of the above product, 64 gm. of milled glass fiber (FIBERGLAS 737 AA brand from Owens Corning), 45 mg. of dibutyltin dilaurate catalyst, and 1.40 gm. of ADOGEN 464 catalyst (Sherex Chemical Company, Inc.) was heated to 50° C. The resulting mixture was then blended with 137 gm. (0.99 isocyanate equivalent weights) of modified 4,4'-diphenylmethane diisocyanate (ISONATE 191 brand from Upjohn Chemical Co.). This final blend was poured into a preheated mold held at 100° C. It cured in 20 seconds, was demolded as a plaque in two minutes, and was postcured in an oven at 120° C. for one hour.

EXAMPLE 2

A mixture of 6.70 kg. (45.3 equivalent weights) of phthalic anhydride, 13.6 kg. (45.3 hydroxy equivalent weights) of polyethylene glycol (mol. wt. 600), 17.4 kg. (91.1 epoxy equivalent weights) of the diglycidyl ether of bisphenol A (EPON 828 brand from Shell Chemical Co.), and 75.3 gm. of ADOGEN 464 catalyst was heated in a 56.8 liter stainless steel reactor at a reaction temperature above 120° C. The reaction was exothermic and was controlled by external cooling. It reached a peak temperature of 132° C. The system was maintained at 120° C. till the resulting product was free of acidic material, which took about 4 hours. A sample of about 1 kg. was discharged and had an epoxy equivalent of 947.

While the above product was hot and held in the reactor, 15.7 kg. (348.5 hydroxy equivalent weights) of 1,4-butanediol was added, and the mixture was heated further at 120° C. for two hours. The product was cooled and had an epoxy equivalent of 1568. The viscosity of the product at room temperature was 48 poise. The product was a clear, light yellow solution which was phase stable for storage.

A mixture of 110 gm. (0.070 epoxy equivalent weight) of the above product, 90 mg. of dibutyltin dilaurate, and 1.40 gm. of ADOGEN 464 catalyst was heated to 50° C. The mixture was then blended with 127 gm. (0.914 isocyanate equivalent weights) of ISONATE 191 diisocyanate. The final blend, after becoming homogeneous, was poured into a preheated mold (80° C.), and it cured in 20 seconds. The plaque was demolded in 2 minutes and post-cured at 120° C. for one hour.

COMPARATIVE EXAMPLE 3

The ingredients and procedures set forth in the first paragraph of Example 2 were applied in this Example except the peak temperature was found to be 135° C. The product had an epoxy equivalent of 890.

While the above product was hot and held in the reactor, 15.7 kg. (348.5 hydroxy equivalent weights) of 1,4-butanediol was added and stirred without any further heating. The mixture was discharged. It was found that the mixture had an epoxy equivalent of 1274 and became two layers at room temperature. The mixture, after mechanical dispersion, had a viscosity of 200 poise at room temperature.

This Example illustrates the inferior results obtained if the prepolymer and polyol chain extender are merely added to one another when hot rather than being heated in the presence of one another for a sufficient amount of time to yield a phase stable composition.

EXAMPLES 4-10

A series of runs was made by employing the same ingredients and procedures set forth in Example 2. Phase stable compositions were obtained in all cases. The observed results and the products are listed in Table 1.

The products were mixed with catalysts (dibutyltin dilaurate, ADOGEN 464 brand, etc.) and filler to form a component (b) which was then heated to produce a material having a lower viscosity and were reacted with an appropriate amount of ISONATE 191 to produce the polyurethane-oxazolidone thermoset compositions as shown in Table II.

TABLE 1

| Example No. | Heat up time (min.) | Reaction Time (min.) | Peak Temp. (°C.) | Epoxide Equivalent | Viscosity at Room Temp. (poise) |
|---|---|---|---|---|---|
| 4 | 60 | 284 | 141 | 1766 | 47 |
| 5 | 53 | 216 | 148 | 1685 | 44 |
| 6 | 56 | 114 | 154 | 1618 | 49 |
| 7 | 47 | 100 | 155 | 1631 | 43 |
| 8 | 50 | 82 | 145 | 1519 | 43 |
| 9 | 53 | 88 | 152 | 1455 | 48 |
| 10 | 59 | 128 | 154 | 1446 | 45 |

TABLE II

Polyurethane-oxazolidone compositions made from the products of Examples 2, and 4-10.

| Plaque ID Ingredients (in gm.) | A | B | C | D | E | F |
|---|---|---|---|---|---|---|
| Component a: ISONATE 191 | 131 | 136 | 138 | 138 | 136 | 127 |
| Component b: Product of Example 2 | 81 | — | — | — | — | — |
| Mixture of Examples 2, 4, 5 (⅓ of each) | — | 118.5 | — | — | — | — |
| Mixture of Examples 6, 7, 8, 9 (¼ of each) | — | — | 120 | 120 | 118.5 | — |
| Product of Example 10 | — | — | — | — | — | 110 |
| Milled Fiber Glass[1] | — | 63.7 | — | — | 74.3 | 59.1 |
| Dibutyltin Dilaurate[2] | 0.09 | 0.075 | 0.09 | 0.09 | 0.045 | 0.045 |
| LiCl complex[3] | — | — | — | 1.38 | — | — |
| ADOGEN 464 | 1.32 | 1.32 | 1.38 | — | 1.40 | 1.38 |
| Temp. (°C.) | 55 | 50 | 52 | 52 | 50 | 52 |

[1] FIBERGLAS OCF 737 AA brand from Owens Corning.
[2] T-12 brand catalyst from M and T Chemicals.
[3] Lithium chloride: hexamethylphosphoramide (1:1) complex.

The foregoing Examples should not be construed in a limiting sense. The scope of protection desired is set forth in the claims which follow.

What is claimed:

1. A process for producing a phase-stable solution composition comprising an isocyanate reactive prepolymer containing hydroxy and epoxy groups and a paraffinic polyol chain extender which comprises heating the prepolymer and polyol in the presence of one another to yield said phase-stable solution composition.

2. A process as claimed in claim 1 wherein the polyol is selected from the group consisting of the butanediols, the hexanediols, the octanediols and ethylene glycol.

3. A process as claimed in claim 1 wherein the polyol is present at from about 5% to about 40%, by weight of the composition.

4. A process as claimed in claim 1 wherein the polyol is 1,4-butanediol.

5. A process as claimed in claim 1 wherein the polyol is 1,4-butanediol and it is present at about 5% to about 40%, by weight of the composition.

6. A process as claimed in claim 1 wherein the prepolymer has the formula

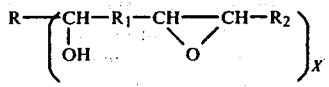

where R, $R_1$ and $R_2$ are independently alkylene, arylene, and alkylene-arylene and, for R and $R_2$, also hydrogen, X being 1 or 2.

7. A process as claimed in claim 1 wherein the prepolymer has the formula

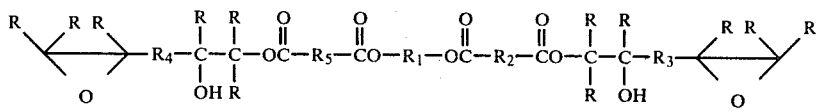

where $R_1-R_2$ are independently alkylene, arylene, and alkylenearylene and R is the same and hydrogen.

8. A process as claimed in claim 1 wherein the prepolymer has the formula

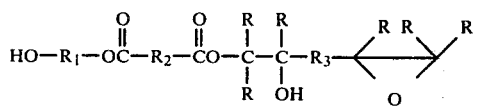

where $R_1-R_3$ are independently alkylene, arylene, and alkylene-arylene and R is the same and hydrogen.

9. A process as claimed in claim 1 wherein the prepolymer is present at from about 60% to about 95% by weight of the composition.

10. A process as claimed in claim 1 wherein the temperature of heating is from about 50° to about 160° C.

11. A phase stable solution composition comprising an isocyanate reactive prepolymer containing hydroxy and epoxy groups and a paraffinic polyol chain extender, said composition being essentially free of a compatibilizing agent for said prepolymer and polyol.

12. A composition as claimed in claim 11 wherein the polyol is selected from the group consisting of the butanediols, the hexanediols, the octanediols and ethylene glycol.

13. A composition as claimed in claim 11 wherein the polyol is present at from about 5% to about 40% by weight of the composition.

14. A composition as claimed in claim 11 wherein the polyol is 1,4-butanediol.

15. A composition as claimed in claim 11 wherein the polyol is 1,4-butanediol, and is present at about 5% to about 40%, by weight of the composition.

16. A composition as claimed in claim 11 wherein the prepolymer has the formula

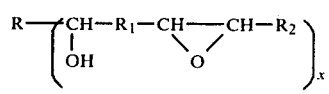

where R, $R_1$ and $R_2$ are independently alkylene, arylene, and alkylene-arylene and, for R and $R_2$, also hydrogen, X being 1 or 2.

17. A composition as claimed in claim 11 wherein the prepolymer has the formula

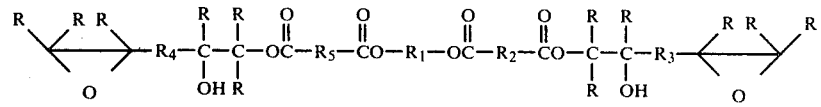

where $R_1-R_5$ are independently alkylene, arylene, and alkylene-arylene.

18. A composition as claimed in claim 11 where the prepolymer has the formula

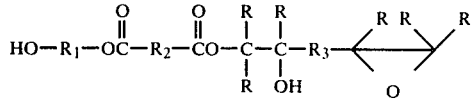

where $R_1-R_3$ are independently alkylene, arylene, and alkylene-arylene and R is the same and hydrogen.

19. A composition as claimed in claim 11 wherein the prepolymer is present at from about 60 to about 95% by weight of the composition.

* * * * *

UNITED STATES PATENT AND TRADEMARK OFFICE
CERTIFICATE OF CORRECTION

PATENT NO. : 4,415,469
DATED : December 9, 1983
INVENTOR(S) : Chung-Chieh Tsai

It is certified that error appears in the above—identified patent and that said Letters Patent is hereby corrected as shown below:

Col. 1, line 29, "ccompatibilizing" should be -- compatibilizing --;

Col. 2, line 26, "the" should be -- that --;

Col. 2, lines 63 - 68, the formula

"$HO\overset{O}{\overset{\|}{C}} - R - \overset{O}{\overset{\|}{C}}OH$" should be -- $HO\overset{O}{\overset{\|}{C}} - R - \overset{O}{\overset{\|}{C}}OH$ --;

Col. 3, line 68, "polyisosyanate" should be -- polyisocyanate --;

Col. 4, line 44, "$R_1 14 R_5$" should be -- $R_1 - R_5$ --;

Col. 9, next to last line of Claim 7, change "$R_1 - R_2$" to -- $R_1 - R_5$ --.

Signed and Sealed this

Fourteenth Day of February 1984

[SEAL]

Attest:

GERALD J. MOSSINGHOFF

Attesting Officer    Commissioner of Patents and Trademarks